(12) United States Patent
Jöngren

(10) Patent No.: US 9,425,873 B2
(45) Date of Patent: *Aug. 23, 2016

(54) METHOD AND APPARATUS FOR CONVEYING PRECODING INFORMATION IN A MIMO SYSTEM

(71) Applicant: TELEFONAKTIEBOLAGET L M ERICSSON (PUBL), Stockholm (SE)

(72) Inventor: George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,453

(22) Filed: Jan. 13, 2014

(65) Prior Publication Data

US 2014/0126661 A1 May 8, 2014

Related U.S. Application Data

(63) Continuation of application No. 12/919,282, filed as application No. PCT/SE2008/051247 on Nov. 3, 2008, now Pat. No. 8,705,466.

(60) Provisional application No. 61/041,964, filed on Apr. 3, 2008.

(51) Int. Cl.
*H04W 4/00* (2009.01)
*H04B 7/04* (2006.01)
*H04B 7/06* (2006.01)

(52) U.S. Cl.
CPC ............ *H04B 7/0456* (2013.01); *H04B 7/0413* (2013.01); *H04B 7/0697* (2013.01)

(58) Field of Classification Search
CPC ........................................................ H04B 7/0456
USPC .......................................................... 370/329
See application file for complete search history.

(56) References Cited

U.S. PATENT DOCUMENTS

| 8,705,466 | B2 * | 4/2014 | Jongren | 370/329 |
| 2008/0186934 | A1 * | 8/2008 | Khan | H04L 1/0046 370/342 |
| 2009/0046788 | A1 * | 2/2009 | Kotecha | H04B 7/0417 375/260 |
| 2010/0023830 | A1 * | 1/2010 | Wengerter et al. | 714/748 |
| 2010/0126660 | A1 * | 5/2010 | O'Hara | 156/249 |

FOREIGN PATENT DOCUMENTS

WO WO 2008032979 A1 * 3/2008 ........... H04B 7/0639

\* cited by examiner

*Primary Examiner* — Maharishi Khirodhar

(57) ABSTRACT

Method and apparatus for conveying precoding information in a control message (M) from a first node (400) to a second node (402), with information on properties of an associated wireless data transmission (D) between the first and second nodes employing spatial multiplexing and precoding for the data transmission. The first node determines precoding parameters (P) for signal transmission to the receiving node, optionally based on feedback reports (F) from the receiving node. The first node encodes control information bits in precoding information fields of the control message by means of values in TBS fields of the control message, such that the TBS field values determine the interpretation of the bits in the precoding information field(s). The control message (M) is then sent to the second node.

40 Claims, 3 Drawing Sheets

| | PDCCH field | # bits |
|---|---|---|
| 1 | Resource allocation | x |
| 2 | Tx power control | 2 |
| 3 | TBS 1 | 5 |
| 4' | TBS 2 | 5 |
| 5 | NDI/RV 1 | 3 |
| 6' | NDI/RV 2 | 3 |
| 7 | HARQ process ID | 3 |
| 8'' | PMI | 4 |
| 9'' | Precoder confirmation | 1 |
| 10'' | RI | 2 |
| 11'' | HARQ swap flag | 1 |

|   | PDCCH field | # bits |
|---|---|---|
| 1 | Resource allocation | x |
| 2 | Tx power control | 2 |
| 3 | TBS 1 | 5 |
| 4' | TBS 2 | 5 |
| 5 | NDI/RV 1 | 3 |
| 6' | NDI/RV 2 | 3 |
| 7 | HARQ process ID | 3 |
| 8" | PMI | 4 |
| 9" | Precoder confirmation | 1 |
| 10" | RI | 2 |
| 11" | HARQ swap flag | 1 |

Fig. 5

METHOD AND APPARATUS FOR CONVEYING PRECODING INFORMATION IN A MIMO SYSTEM

CROSS-REFERENCE TO RELATED APPLICATIONS

This application is a continuation of U.S. application Ser. No. 12/919,282, filed Aug. 25, 2010, which is a 371 of International Application No. PCT/SE2008/051247, filed Nov. 3, 2008, which claims the benefit of U.S. Provisional Application No. 61/041,964, filed Apr. 3, 2008, the disclosure of which is incorporated herein by reference.

TECHNICAL FIELD

The present invention relates generally to a method and apparatus for supporting wireless transmissions in a telecommunication system when multiple antennas are used.

BACKGROUND

In 3GPP (3$^{rd}$ Generation Partnership Project), the packet-switched communication systems LTE (Long Term Evolution) and HSPA (High Speed Packet Access) have been specified for wireless transmission of data packets between user terminals and base stations in a cellular/mobile network. LTE and other systems generally use OFDM (Orthogonal Frequency Division Multiplexing) involving multiple closely spaced orthogonal sub-carriers, which is a well-known technique in the art. The sub-carriers are further divided into timeslots where each frequency/timeslot combination is referred to as a resource element.

In this description, a "sending node" is a node which sends information carrying signals over a wireless link, and a "receiving node" is a node which receives and hopefully detects those signals. In the case of downlink transmissions, the sending node is a base station and the receiving node is a user terminal, and vice versa for uplink transmissions.

The use of multiple antennas in signal sending nodes and/or signal receiving nodes may enhance capacity, coverage and reliability in a wireless communication system, e.g. by achieving increased data throughput and/or better signal detection at the receiving node. Multiple antennas can be employed in both user terminals and base stations to enable parallel and spatially multiplexed data streams using the same radio channel resource, which is commonly referred to as "MIMO" (Multiple-Input, Multiple-Output).

In particular, LTE is currently being developed to support and utilise MIMO related techniques to provide high data rates in favourable channel conditions. Other wireless communication systems that may also be relevant for the following description include WCDMA (Wideband Code Division Multiple Access), WiMAX, UMB (Ultra Mobile Broadband), GPRS (General Packet Radio Service) and GSM (Global System for Mobile communications).

In MIMO systems, spatial multiplexing is obtained by transmitting plural parallel information carrying signals at the same time and frequency while the different signals are spatially separated from each other by means of plural transmit antennas. The number of parallel signals or data streams being transmitted simultaneously is referred to as the "transmission rank".

Furthermore, by adapting the signal transmission to the current channel conditions or properties, significant improvements may be achieved. "Transmission rank adaptation" is one form of such adaptation where the transmission rank is dynamically adjusted to what the used channel is currently able to support. Another form of signal transmission adaptation is "channel dependent precoding" where the phases and amplitudes of multiple parallel signals are adjusted to match the current channel properties. Classical beam-forming is in fact one example of precoding where the signal phase of the signal from each transmit antenna is adjusted such that the signals add constructively at the receiving node.

The parallel signals to be transmitted from multiple antennas form a vector-valued signal. When precoding is employed, the signals are effectively adjusted at the sending node by multiplying the vector-valued signal by a selected precoder matrix. This procedure is illustrated schematically in FIG. 1. A coding and modulation unit, not shown, takes information bits as input and basically produces a sequence of information carrying symbol vectors in different parallel symbol streams referred to as "layers" 100. In FIG. 1, r different layers 1-r are shown implying a transmission rank of r. Thus, the signal to be transmitted is comprised of r parallel symbol streams forming elements of a symbol vector s, which are fed into a precoder unit 102.

In precoder unit 102, an $N_T \times r$ precoder matrix W is currently used to adjust the r symbol streams in vector s, where $N_T$ denotes the number of transmit antennas or antenna ports used. The r symbols in the symbol vector s are thus multiplied by the $N_T \times r$ precoder matrix W to produce an adjusted symbol vector s' which is converted into OFDM signals by IFFT (Inverse Fast Fourier Transform) units 104 in a well-known manner. The produced OFDM signals are then finally transmitted from the antennas or antenna ports $1-N_T$.

An $N_T \times N_R$ MIMO channel H, used between a sending node with $N_T$ transmit antennas and a receiving node with $N_R$ receive antennas, is generally represented with the $N_T \times N_R$ matrix, and the precoder matrix W is often chosen to match the properties and characteristics of channel H. When signals are transmitted over channel H, a received vector $y_k$ for a certain resource element on a sub-carrier k, or alternatively a resource element k, can be modelled by the receiving node as:

$$y_k = HWs_k + e_k \tag{1}$$

assuming no inter-cell interference and that precoder matrix W is known. The term $e_k$ is modelled as a noise vector obtained by realisations of a random process.

In channel dependent precoding, the precoder matrix may be selected at the sending node based on information on the current channel properties as reported from the receiving node to the sending node in a feedback report. A common approach is to select the precoder matrix from a predefined set of precoder matrices, referred to as a codebook which is known at both nodes. Codebook based precoding is generally employed by the LTE standard.

The receiving node, typically a user terminal, detects the current channel properties based on measurements on signal transmissions from the sending node, typically a base station, and evaluates the precoder matrices in the codebook to determine the most appropriate one for use in the current conditions. The receiving node reports back to the sending node a precoder matrix that is recommended for signal transmission, and the sending node is then able to apply a suitable precoder matrix for the transmission, taking the recommended one into consideration.

The receiving node may recommend a single precoder matrix assumingly covering a relatively large bandwidth of multiple sub-carriers allocated for the used channel, i.e. "wideband" precoding. Alternatively, when the channel properties are notably different for different frequencies, it may be beneficial to match individual frequencies of the channel and provide a frequency-selective precoding recommendation, specifying different precoders for different sub-carriers or sub-bands of the total bandwidth used.

As a result from the above, channel dependent precoding typically requires substantial signalling support, particularly for frequency-selective precoding schemes. In addition to the above-described feedback signalling from the receiving node to the sending node, signalling in the opposite direction is typically also necessary to indicate which precoder is actually used in the signal transmission. Hence, the sending node may not be assured it has obtained a correct or relevant precoder report from the receiving node, and the receiving node must also make sure which one is used in order to process the received signals correctly.

The amount of signalling between the receiving node and the sending node can be reduced if the sending node merely sends a brief precoder confirmation, indicating whether the recommended precoder(s) has been applied or not. Basically, a single bit can be used for this purpose, where "1" could mean that the transmitter has applied the recommended precoder(s), while "0" could mean that another, possibly fixed or default precoder is used, thereby overriding the precoder recommendation. For example, "0" would also be signalled if the feedback information could not be correctly decoded at the sending node.

However, the above precoder confirmation scheme implies that any decoding errors in the feedback information should preferably be detected, and the feedback information must therefore be coded accordingly, e.g. by including a CRC (Cyclic Redundancy Check) in the report, which increases the report size even more. An alternative to using a fixed or default precoder scheme is to also signal a single wideband precoder to the receiving node. Other precoder confirmation scheme have also been proposed, which are not necessary to described here though. Instead of explicitly signalling to the receiving node which frequency-selective precoders are actually used by the sending node, the above precoder confirmation methods can thus be employed to substantially reduce the amount of overhead signalling to the receiving node.

The encoded bits, or even modulated symbols, originating from a particular block of information bits, often called a transport block, can be referred to as a "codeword". This term is also used in LTE to describe the output from a specific so-called "HARQ (Hybrid Automatic Repeat ReQuest) process" serving a particular transport block and providing for retransmission of any erroneously decoded codeword. A HARQ process involves various coding schemes such as turbo encoding, rate matching, interleaving etc.

A generated codeword is modulated and distributed over the antennas of the sending node. Further, data from plural codewords can be transmitted simultaneously, also known as "multi-codeword transmission". For example, in a sending node with four transmit antennas 1-4, a first modulated codeword may be mapped to antennas 1 and 2, and the next codeword may be mapped to antennas 3 and 4, and so forth. In the above context of precoding, the codewords are first mapped to layers instead of being mapped directly to the antennas.

In the field of multi-antenna transmissions of high data rate, a specific feature of the prevailing channel conditions/properties is the so-called "channel rank" which indicates how many simultaneous signals or data streams that the current channel can actually support. Basically, the channel rank can vary from one up to the least number of transmit and receive antennas present at the sending and receiving nodes, respectively. For example, in a 4×2 MIMO system with four transmit antennas and two receive antennas, the maximum channel rank is two.

Furthermore, the channel rank may vary in time, e.g. since fluctuating parameters such as fast fading and interference typically influence the channel properties. Moreover, the channel rank determines how many layers, and ultimately also codewords, that can be successfully transmitted simultaneously. Hence, if the current channel rank is only one when simultaneously transmitting two codewords mapping to two separate layers, i.e. using a transmission rank of two, the two signals corresponding to the codewords will most likely interfere so much that both codewords are erroneously detected at the receiving node.

When precoding is employed, the transmission can be adapted to the channel rank by using as many layers as the current channel rank. In a simple case, each layer is transmitted over a particular antenna. However, the number of codewords to transmit may differ from the number of layers used, e.g. as in LTE. In that case, the codewords must be mapped onto the layers. For example, when four transmit antennas are available at the sending node, the maximum number of codewords is limited to two, while up to four layers can be transmitted simultaneously over the respective antennas when the current channel rank=4. A fixed channel rank-dependent mapping of codewords onto layers could then be used.

FIGS. 2a-e illustrate some examples of possible mapping of codewords onto layers for different channel ranks, and when four transmit antennas are available at a sending node. In the figures, "S/P" denotes an operation of transforming serial signals to parallel signals, which is well-known in the art. In these examples, the produced layers are distributed on the four antennas 202 by a precoder unit 200, which adjusts the symbol streams in the layers by means of a selected precoder matrix basically as described above.

In FIG. 2a where rank=1, one codeword CW1 is mapped onto a single layer L1. In FIG. 2b where rank=2, a first codeword CW1 is mapped onto a first layer L1, while a second codeword CW2 is mapped onto a second layer L2. In FIG. 2c where rank=2 again, one codeword CW1 is alternatively mapped onto two layers L1 and L2. In FIG. 2d where rank=3, a first codeword CW1 is mapped onto a first layer L1, while a second codeword CW2 is mapped onto a second layer L2 and a third layer L3. In FIG. 2e where rank=4, a first codeword CW1 is mapped onto a first layer L1 and a second layer L2, while a second codeword CW2 is mapped onto a third layer L3 and a fourth layer L4.

When dynamic transmission rank adaptation and channel dependent precoding are employed for a MIMO channel, substantial amounts of MIMO related control information needs to be signalled from the sending node to the receiving node to support the precoding, as mentioned above. In LTE for example, a control channel called PDCCH (Physical Downlink Control Channel) is used for conveying such MIMO related information from a signal sending base station to a signal receiving user terminal. The PDCCH is currently configured with various information fields in which 16 bits are used for MIMO information, out of which 8 bits relate to precoding.

However, it is a drawback in the existing ways of conveying MIMO and precoder related information from a sending node to a receiving node, as exemplified by the above-mentioned PDCCH, that a large signalling overhead is required. As a result, the coverage of control signalling may be seriously reduced, implying that control channel coverage may well be a limiting factor in the use of MIMO. Furthermore, no efficient support has been provided for so-called transmission rank override in the above-described precoder confirmation.

Transmission rank override thus means that the sending node is able to override the recommendation of transmission rank obtained from the receiving node. This functionality may be useful in several situations, such as when the buffer has very limited amounts of data to send, or when scheduling on a significantly smaller part of the bandwidth than what the single recommended "wideband" transmission rank refers to, etc. In addition, when a HARQ process is originally transmitted mapped to two layers using transmission rank 3 or 4, that HARQ process cannot efficiently provide for retransmission if the transmission rank is reduced to 2 due to fluctuating channel properties.

Hence, it is generally a problem that the payload for conveying MIMO and precoder related information, e.g. transmission rank indicator (TRI), precoder confirmation, explicit precoder matrix indicator (PMI), from a signal sending node to a signal receiving node is typically large and requires substantial signalling bandwidth. Conversely, when only a limited given payload size is available for control signalling, there may be a need to support the signalling of additional control information.

SUMMARY

It is an object of the present invention to generally address the problems outlined above. Further, it is an object to provide a solution that enables a reduced signalling overhead when conveying precoder related information from a sending node to a receiving node, and/or improved efficiency and flexibility for spatial multiplexing. These objects and others may be accomplished by a method and apparatus according to the attached independent claims.

According to one aspect, a method is provided in a first node for conveying precoding information in a control message to a second node, the message containing information that describes properties of an associated wireless data transmission between the first and second nodes employing spatial multiplexing and precoding for sending codewords corresponding to transport blocks in the wireless data transmission. In this method, precoding parameters are determined for inclusion in the control message to the second node. Control information bits in at least one precoding information field of the control message are then encoded according to the determined precoding parameters by means of values in payload size related TBS fields in the control message, wherein the TBS field values are set to determine the interpretation of the control information bits in the precoding information field(s). Finally, the control message with the precoding information and TBS fields are sent to the second node.

According to another aspect, an apparatus is provided in a first node for conveying precoding information in a control message to a second node, the message containing information that describes properties of an associated wireless data transmission between the first and second nodes employing spatial multiplexing and precoding for sending codewords corresponding to transport blocks in the wireless data transmission. The apparatus in the first node comprises a precoding determining unit adapted to determine precoding parameters to be included in the control message to the second node. The apparatus also comprises a control message encoding unit adapted to encode control information bits in at least one precoding information field of the control message according to the determined precoding parameters by means of values in payload size related TBS fields in the control message, wherein the TBS field values are set to determine the interpretation of the control information bits in the precoding information field(s). The apparatus further comprises a control message sending unit adapted to send the control message with the precoding information and TBS fields to the second node.

According to yet another aspect, a method is provided in a second node for obtaining precoding information in a control message from a first node, the message containing information that describes properties of an associated wireless data transmission between the first and second nodes employing spatial multiplexing and precoding for sending codewords corresponding to transport blocks in the wireless data transmission. In this method, the control message is first received from the first node and includes precoding parameters determined by the first node. The precoding parameters are then detected by decoding control information bits in at least one precoding information field of the control message by means of values in payload size related TBS fields in the control message, wherein the TBS field values are used to interpret the control information bits in the precoding information field(s).

According to yet another aspect, an apparatus is provided in a second node for obtaining precoding information in a control message from a first node, the message containing information that describes properties of an associated wireless data transmission between the first and second nodes employing spatial multiplexing and precoding for sending codewords corresponding to transport blocks in the wireless data transmission. The apparatus in the second node comprises a control message receiving unit adapted to receive the control message including precoding parameters determined by the first node. The apparatus also comprises a control message decoding unit adapted to detect the precoding parameters by decoding control information bits in at least one precoding information field of the control message by means of values in payload size related TBS fields in the control message, using the TBS field values to interpret the control information bits in the precoding information field(s).

Different embodiments are possible in the methods and apparatuses above. In one exemplary embodiment, bits in the precoding information field(s) of the control message imply different predefined sets of precoding information messages depending on the set TBS field values. In another embodiment, the precoding information comprises any one or both of: a transmission rank indicating the number of parallel layers or data streams being simultaneously used for the associated data transmission, and at least one selected precoder matrix used for adapting signals transmitted from multiple antennas at the node sending the data.

According to further embodiments, the data is transmitted from the first node to the second node and the precoding parameters are determined based on current channel properties indicated in a feedback report received from the second node, and/or by the amount of retransmissions due to decoding errors at the second node. The second node may be a terminal and the first node may be a base station ordering the terminal to transmit uplink data according to the conveyed precoding information.

In other embodiments, the TBS fields may indicate a payload size pair corresponding to the payload size of a first transport block and a second transport block. The payload size pair may then be set as (TBS, 0) indicating that a first codeword is enabled and transmitted with size TBS while a second codeword is disabled, or as (TBS1, TBS2) indicating that two codewords are enabled and transmitted simultaneously with size TBS1 and TBS2, respectively. The payload size pair may determine the interpretation of precoder information bits in the control message to support transmission rank override for precoder confirmation when frequency-selective precoding is employed.

The control message could be a PDCCH message with precoding related information fields, the precoding related information corresponding to a "Rank Indicator RI" or "Transmission Rank Indicator TRI", a "Precoder Matrix Indicator PMI", and/or precoder confirmation, wherein these parts in the precoding related information are jointly encoded.

According to further embodiments, the TBS field values are used to indicate a HARQ process to codeword mapping according to (TBS, 0) indicating that HARQ process 1 is mapped to codeword 1 which is transmitted, or (0, TBS) indicating that HARQ process 2 is mapped to codeword 1 which is transmitted, or (TBS1, TBS2) indicating that codewords 1 and 2 are both transmitted. A fixed HARQ process to codeword mapping may also be used where the TBS field values are used according to (TBS, 0) indicating that codeword 1 is transmitted, or (0, TBS) indicating that codeword 2 is transmitted, or (TBS1, TBS2) indicating that codewords 1 and 2 are both transmitted.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which:

FIG. 5 is a table illustrating how fields in a PDCCH message can be used to encode precoder related information, in accordance with another embodiment.

DETAILED DESCRIPTION

Figure 1:
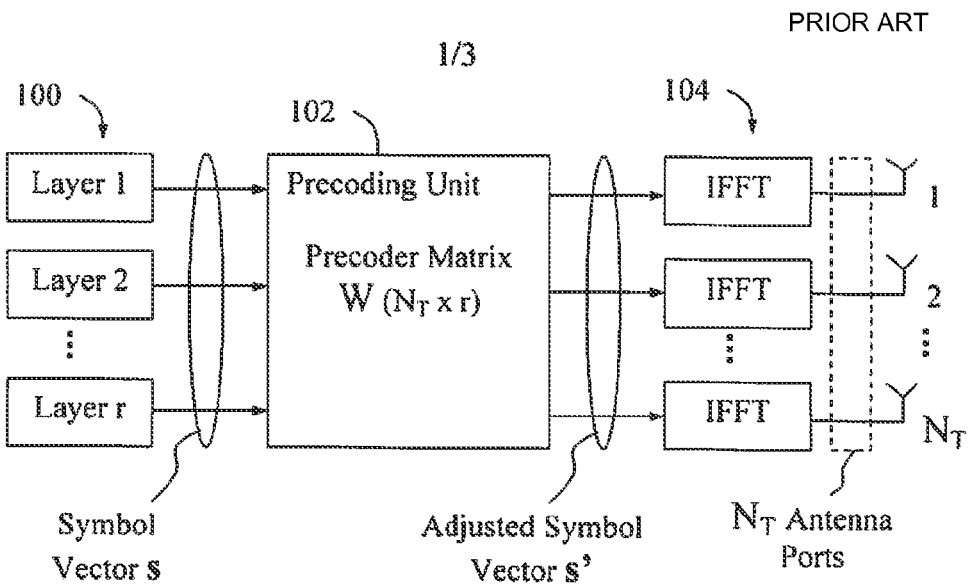
FIG. 1 illustrates a precoding procedure in a signal sending node using multiple transmit antennas, according to the prior art.

The present invention can be used to reduce the signalling overhead needed for precoder signalling, and/or to provide improved flexibility for conveying precoder related information, as follows. It can also be used to utilise any available limited signalling space more efficiently, e.g. within prevailing header size restrictions dictated by any standard protocol(s) used.

It is assumed that one node is obliged to send control information to another node that describes the properties of an associated wireless data transmission between the nodes, and that the control information should include fields with information on the payload size of this associated data transmission. These fields are generally denoted "payload size related fields" in this description.

Briefly described, existing payload size related fields in a control message conveyed from a first node to a second node, carrying information on the payload size of an associated data transmission that the control message refers to, are utilised to also control or dictate the interpretation of precoding information provided in one or more specific fields of the control message. Thus, in addition to determining the payload size of transmitted transport blocks, values in the payload size related fields are also used to encode information bits in the precoding information field(s) according to precoding parameters selected for data transmission. The bits communicated in the precoding information field(s) of the control message will thus imply different predefined sets of precoding information messages depending on the values communicated in the payload size related fields of that message, thereby providing better efficiency and flexibility without increasing the overall signalling overhead, which will be described in more detail below by way of exemplary embodiments.

In the above-mentioned PDCCH message, the payload size related fields are referred to as "TBS (Transport Block Size) fields" which term may represent any payload size related fields that can be used for implementing the invention. For most payload sizes in LTE, the fields reserved for resource allocation and MCS (Modulation and Coding Scheme) jointly determine the payload size of a transport block. Sometimes additional fields are involved as well, such as e.g. the redundancy version (RV) field.

In any case, plural fields in the control message may jointly determine the payload size of a transport block in an associated transmission, and these fields could hence be mapped to a certain TBS value. The present invention may thus be generally used to exploit the presence of a TBS value per transport block, possibly inferred or implied from other fields, without relying on exactly how these TBS values are derived, which is outside the scope of this invention. Hence the term "TBS field" should not necessarily be interpreted literally as it may also refer to an implicit or inferred TBS value.

Furthermore, the present invention is not limited to the terminology of TBS fields. It should also be noted that conventional channel coding of the control message may further be executed, in addition to the above encoding of information bits in the precoding information field(s). Thus, the encoding of precoding information bits by means of TBS fields or the equivalent as described herein, should not be confused with any conventional channel coding or the like.

The present invention enables that information entities in the precoding information field(s) of the control message, such as transmission rank indicator (TRI), precoder confirmation, explicit precoder matrix indicator (PMI), can be jointly encoded. By utilizing the values in the payload size related TBS fields in this way, further compression of the signalling overhead incurred by the control information can be achieved. When using this solution in practice, support for the above-described functionality of transmission rank override for precoder confirmation as well as transmission of a single codeword over two-layers, can be added without requiring any extra signalling bandwidth.

A standard PDCCH message is configured to contain a precoding information field previously called the "HARQ swap flag field" and currently referred to as the "transport block to codeword swap flag". This flag is normally used to indicate the mapping of HARQ processes to codewords, e.g. to indicate which codeword to retransmit. In that case, the TBS fields in the PDCCH message can be further utilised to indicate the codeword to be retransmitted such that the original HARQ swap flag field becomes redundant and can be omitted, thereby further compressing the precoding information in the PDCCH message.

Figure 3:
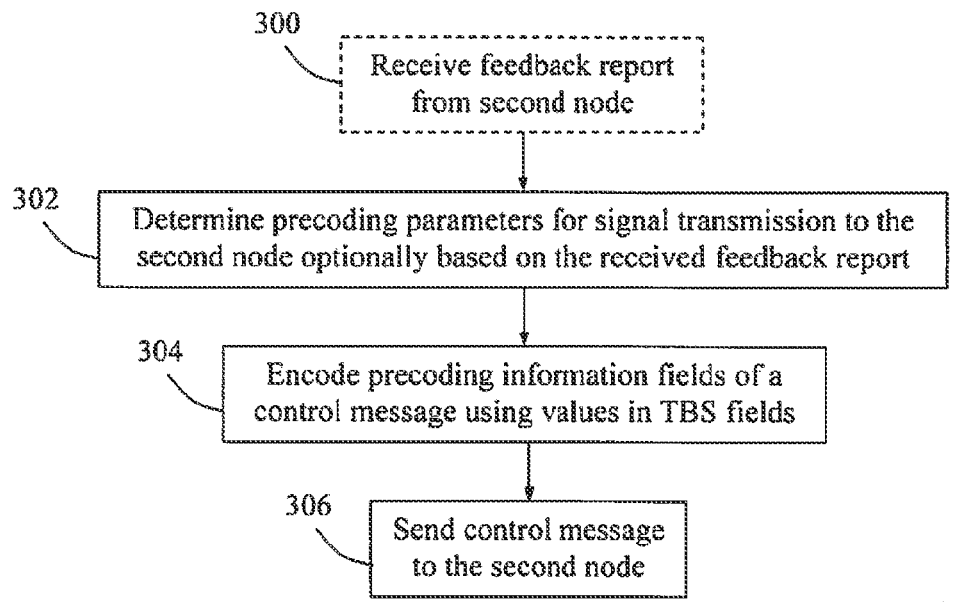
FIG. 3 is a flow chart illustrating a procedure for conveying precoder related information from a signal sending node to a signal receiving node, in accordance with one embodiment.

FIG. 3 is a flow chart illustrating a procedure in a first node for conveying precoding information in a control message to a second node, the control message containing information that describes properties of an associated wireless data transmission employing spatial multiplexing and precoding for sending codewords corresponding to transport blocks. The first node may be a data sending node and the second node may be a data receiving node, or vice versa. Although precoding information is typically conveyed from a data sending node to a data receiving node, it is also possible to convey such precoding information from a data receiving node to a sending data node, e.g. in the case when the first node is a base station that orders a terminal, being the second node, to transmit uplink data according to the conveyed precoding information, e.g. with a certain precoder and transmission rank. In that case, the base station is the first node receiving data, and the terminal is the second node sending data.

It is assumed that the used control message is configured to contain fields reserved for information on the size of communicated transport blocks or the like, i.e. the above-mentioned TBS fields. However, the term "TBS" is used in this description to represent any parameter or set of parameters indicating the size of data transport units in general. Further, the term "codeword" is used to represent any predefined set of encoded data bits. The control message is further configured to also contain one or more precoding information fields.

In a first optional step 300, assuming that the first node is a data sending node and the second node is a data receiving node, a feedback report referring to the current channel properties may be received from the second node, e.g. according to the above-described mechanism of signal transmission adaptation by channel dependent precoding. Typically, a receiving node is obliged to frequently provide such feedback reports to the sending node in order to keep the channel properties up-to-date therein. A transmission rank and one or more precoder matrices may be recommended in the feedback report, as mentioned above. However, this step may be omitted depending on the implementation.

In a next step 302, precoding parameters are determined or selected for an associated data transmission between the two nodes, which may comprise a transmission rank and/or a predefined precoder matrix. The precoding parameters can be determined optionally based on the received feedback report, although other basis may additionally or alternatively be used, e.g. the amount of retransmissions of data due to data decoding errors at the receiving node.

As described above, a receiving node may recommend certain precoding parameters in a feedback report, and the sending node will then either confirm or override the recommendation. Further, if no or insufficient basis for determining precoding parameters is available, the first node may select default precoding parameters for the data transmission. In either case, the second node must be notified which precoding parameters are used, in order to either receive and process received signals properly when being a receiving node, or transmit data accordingly when being a sending node.

In a following step 304, information bits in the precoding information field(s) in the control message are therefore encoded according to the determined/selected precoding parameters, using values in the TBS fields. In this way, the various constituent parts in the precoding information field(s) are jointly encoded and the values set in the payload size related TBS fields will affect the encoding. Thereby, the bits in the precoding information field(s) can imply different precoding related information or messages depending on the values in the TBS fields, without increasing the overall signalling overhead. The available signalling space in the precoding information field(s) is also utilised more efficiently, as compared to the prior art solutions. It is also possible to compress the space for precoding information in the message, e.g. by omitting a HARQ flag field which can be indicated by the TBS field values instead, which will be described in more detail below.

In addition to the above encoding of information bits in the precoding information field(s) according to selected precoding parameters, conventional channel coding of the control message may further be employed, which is however outside the scope of the present invention. In a final step 306, the control message, containing the TBS encoded bits in the precoding information field(s), is sent to the second node.

A corresponding procedure will be executed in the second node to obtain the precoding information in the control message from the first node. Firstly, the control message is received including precoding parameters determined by the first node. Secondly, the precoding parameters are detected by decoding control information bits in at least one precoding information field of the control message by means of values in payload size related TBS fields in the control message. The TBS field values are then used to interpret the control information bits in the precoding information field(s).

Figure 4:
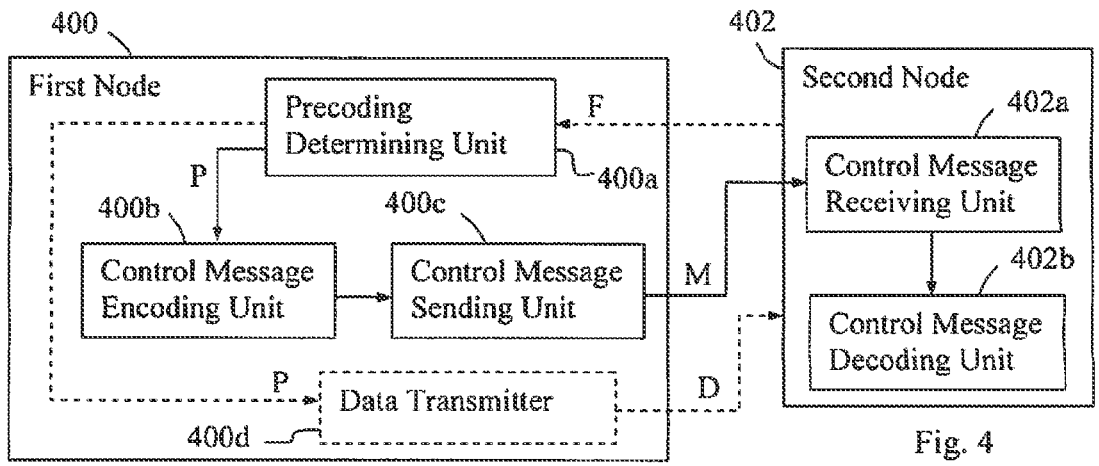
FIG. 4 is a block diagram illustrating a signal sending node in more detail, in accordance with further embodiments.

FIG. 4 is a block diagram illustrating an apparatus in a first node 400 for conveying precoding information in a control message to a second node 402. The first node 400 may be a data sending node and the second node 402 may be a data receiving node, or vice versa. As in the example of FIG. 3 described above, the control message contains information that describes properties of an associated wireless data transmission between the nodes employing spatial multiplexing and precoding for sending codewords corresponding to transport blocks in the data transmission. The control message is configured to contain one or more precoding information fields and TBS fields, or generally payload size related fields. The first node apparatus in FIG. 4 comprises functional units 400a-d basically adapted to support the procedure of FIG. 3.

The first node apparatus in FIG. 4 comprises a precoding determining unit 400a adapted to determine precoding parameters P for the data transmission with the second node, e.g. according to regular procedures and optionally based on feedback reports F received from the second node 402 if the first node is the one sending data. Unit 400a provides the precoding parameters P to a control message encoding unit 400b, which is adapted to encode information bits in the precoding information field(s) in the message based on values set in the TBS fields in accordance with the determined precoding parameters P, basically as described above for step 304.

The first node apparatus 400 further comprises a control message sending unit 400c, which is adapted to send the control message M with TBS encoded bits in the precoding information field(s) to the second node 402. If the first node 400 is the data sending node, the determined precoding parameters P are also provided to a data transmitter 400d for use during transmission of data D to the second node 402. On the other hand, if the second node 402 is the data sending node, the precoding parameters P received from the first node 400 are provided to a corresponding data transmitter in the second node 402, not shown, for use during transmission of data to the first node 400. Depending on the implementation, unit 400a may provide the parameters P to unit 400b either directly or via the data transmitter 400d or via any other functional unit not shown here, and this embodiment is generally not limited in this respect.

An apparatus is also provided in the second node 402 for obtaining the precoding information in the control message M from the first node 400. The second node apparatus 402 comprises a control message receiving unit 402a adapted to receive the control message M including the precoding parameters determined by the first node, and a control message decoding unit 402b. The latter is adapted to detect the precoding parameters by decoding control information bits in at least one precoding information field of the control message by means of values in the payload size related TBS fields in the control message. The control message decoding unit 402b uses the TBS field values to interpret the control information bits in the precoding information field(s).

It should be noted that FIG. 4 merely illustrates the functional units 400a-d and 402a,b in a logical sense, while the above-described functions can be implemented in practice using any suitable software and hardware, without departing from the present invention. Typically, both data and control messages are communicated by means of the same physical transmission equipment in each node including transceiver and antenna parts.

It will now be described in more detail how the encoding of information bits in precoding information fields in the control message, based on values set in the TBS fields, can be executed in practice by means of some exemplary embodiments. The following sections describe how bits in the precoding information fields and MIMO related fields in the PDCCH message used in LTE may be encoded for support of precoding and spatial multiplexing mode when transmitting data from a sending node to a receiving node.

In FIG. 5, a table is shown with different information fields in a PDCCH message configured in accordance with the current proposed LTE standard to indicate various parameters relevant for transmission, which a data sending node is obliged to send to a data receiving node. The first column indicates a field order number, the second column indicates the field contents, and the third column specifies how many bits are available in each PDCCH field. The first column also contains an asterisk (*) for those fields carrying information needed when MIMO is employed. The shown PDCCH message can provide for the simultaneous transmission of a maximum of two codewords 1 and 2.

In more detail, the numbered PDCCH fields in FIG. 5 relate to: 1) resource allocation with a varying number x of bits depending on the system bandwidth, 2) transmission power control with 2 bits, 3) a first TBS 1 for codeword 1 with 5 bits, 4) a second TBS 2 for codeword 2 with 5 bits, 5) New Data Indicator NDI 1 and Redundancy Version RV 1 for codeword 1 with 3 bits, 6) NDI 2 and RV 2 for codeword 2 with 3 bits, 7) a HARQ process identity with 3 bits, 8) Precoder Matrix Information PMI with 4 bits indicating which precoder matrix is actually used, 9) precoder confirmation with 1 bit that can be "1" if recommended transmission rank and precoder matrix are used or "0" if another rank and matrix are used, 10) transmission Rank Indicator RI with 2 bits, and 11) HARQ swap flag with 1 bit. It should be noted that the parameters PMI and RI above may also be referred to as TPMI (Transmission PMI) and TRI (Transmission RI), respectively.

According to FIG. 5, the PDCCH fields 4, 6 and 8-11 all contain "MIMO related" information, i.e. information communicated only when MIMO is employed, and fields 8-11 specifically contain precoding information. Hence, a total of 16 bits in the message can be used for MIMO information out of which 8 bits relate to precoding. Moreover, there are two TBS fields allowing for two different TBS values TBS 1 and TBS 2 to indicate the transport block size used for up to two corresponding codewords.

According to different embodiments, the TBS values for the two codewords 1 and 2 can be selected to also encode the precoding information in the shown PDCCH format as follows. The TBS values TBS 1 and TBS 2 determine the interpretation of the precoder information bits in fields 8-11. Thus, the TBS fields indicate a payload size pair (TBS1, TBS2) corresponding to the payload size of a first transport block and a second transport block, respectively. The payload size pair (TBS1, TBS2) for the two codewords signals or indicates the following:

(TBS, 0): One codeword is enabled and transmitted with size TBS while the other codeword is disabled.

(TBS1, TBS2): Two codewords are enabled and transmitted simultaneously with size TBS1 and TBS2, respectively.

In addition to indicating the number of transmitted codewords, these signalling options can also determine the interpretation of the precoder information bits. This provides for compression of the size of the control message and may even allow for support of additional functionality such as, e.g., transmission rank override for precoder confirmation when frequency-selective precoding is employed. In one embodiment, the transmission rank override can be indicated by using specified columns of all recommended precoders in the latest feedback report conveyed from the receiving node to the sending node. The information types RI, PMI and precoder confirmation in fields 10, 8 and 9, respectively, can be jointly encoded as specified below for two different MIMO transmission cases. It should be noted that the different PMI values below refer to specific predefined precoding matrices, e.g. in a known codebook.

1. MIMO with Two Transmit Antennas (2 Tx MIMO)

When transmission rank=1 and one codeword is enabled by signalling (TBS,0), 3 bits can be used to signal one of 6 different possible precoding related messages with the precoding information, including:
  a) 4 messages with RI=1 combined with PMI=0, 1, 2 or 3,
  b) 1 message with RI=1 combined with "precoder report confirmed, use $1^{st}$ precoder column", and
  c) 1 message with RI=1 combined with "precoder report confirmed, use $2^{nd}$ precoder column".

When transmission rank=2 and two codewords are enabled by signalling (TBS1, TBS2), 2 bits can be used to signal one of 3 different possible precoding related messages, including:
  d) 2 messages with RI=1 combined with PMI=0 or 1, and
  e) 1 message with RI=2 combined with "precoder report confirmed".

2. MIMO with Four Transmit Antennas (4 Tx MIMO)

When transmission rank=1 or 2 and one codeword is enabled by signalling (TBS,0), 6 bits can be used to signal one of 34 different possible precoding related messages including:
  a) 16 messages with RI=1 combined with PMI=0, 1, 2, . . . or 15,
  b) 1 message with RI=1 combined with "precoder report confirmed",
  c) 16 messages with RI=2 combined with PMI=0, 1, 2, . . . or 15, and
  d) 1 message with RI=2 combined with "precoder report confirmed".

When transmission rank=2, 3 or 4 and two codewords are enabled by signalling (TBS1,TBS2), 6 bits can be used to signal one of 51 different possible precoding related messages including:
  e) 16 messages with RI=2 combined with PMI=0, 1, 2, . . . or 15,
  f) 1 message with RI=2 combined with "precoder report confirmed",
  g) 16 messages with RI=3 combined with PMI=0, 1, 2, . . . or 15,
  h) 1 message with RI=3 combined with "precoder report confirmed".
  i) 16 messages with RI=4 combined with PMI=0, 1, 2, . . . or 15,
  j) 1 message with RI=4 combined with "precoder report confirmed".

In this way, the number of bits needed to convey the precoder information above can be reduced in the PDCCH message since the TBS values control and limit the choice of possible precoding messages. It should be noted that when 1 codeword is transmitted and RI=2 for 4 Tx MIMO, as shown in the examples 2c) and 2d) above, one codeword is transmitted on two layers, such as when CW1 is transmitted on L1 and L2 in FIG. 2c. Furthermore, for 4 Tx MIMO in the examples 2a)-j) above, the precoder column subset is implicitly known and can be derived through the codeword to layer mappings shown in FIG. 2a-e.

It is also possible to omit field 11 of FIG. 5 normally containing the HARQ swap flag which indicates the mapping from HARQ processes to codewords. In addition to indicating the number of transmitted codewords, the TBS values in fields 3 and 4 of FIG. 5 can be further used to indicate the HARQ process mapping according to the following:

(TBS, 0): HARQ process 1 is mapped to codeword 1 which is transmitted,
(0, TBS): HARQ process 2 is mapped to codeword 1 which is transmitted, and
(TBS1, TBS2): Codewords 1 and 2 are both transmitted where HARQ process 1 is mapped to codeword 1 and HARQ process 2 is mapped to codeword 2.

The above allows selection of which HARQ to transmit when the transmission rank=1. Alternatively, when a fixed HARQ process to codeword mapping is used, the TBS fields can be further used to indicate:

(TBS, 0): Codeword 1 is transmitted,
(0, TBS): Codeword 2 is transmitted, or
(TBS1, TBS2): Codewords 1 and 2 are both transmitted.

Figure 2A:
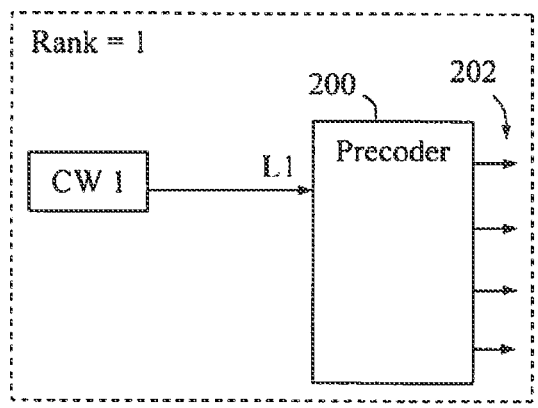
FIGS. 2a-e illustrate some examples of how codewords are mapped onto layers for different channel ranks using four transmit antennas at a sending node, according to the prior art.
Figure 2B:
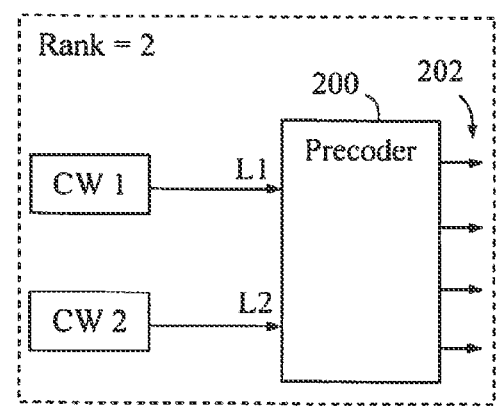
Figure 2C:
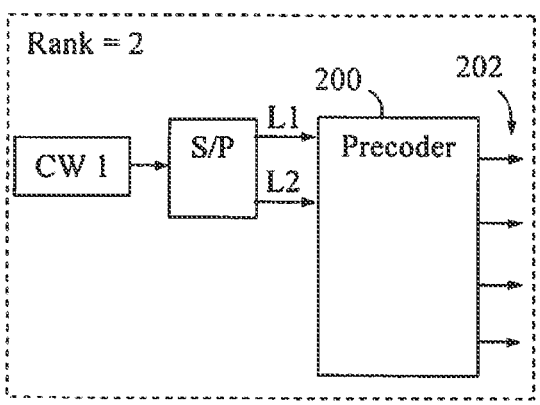
Figure 2D:
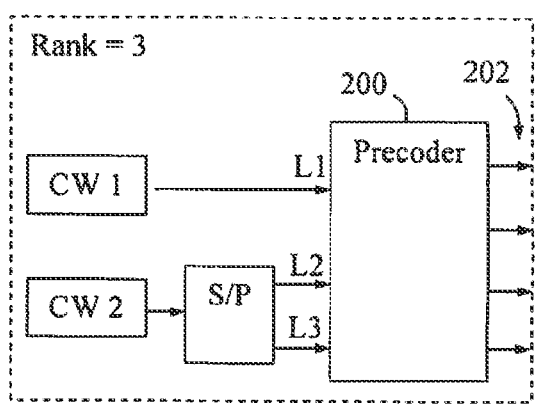
Figure 2E:
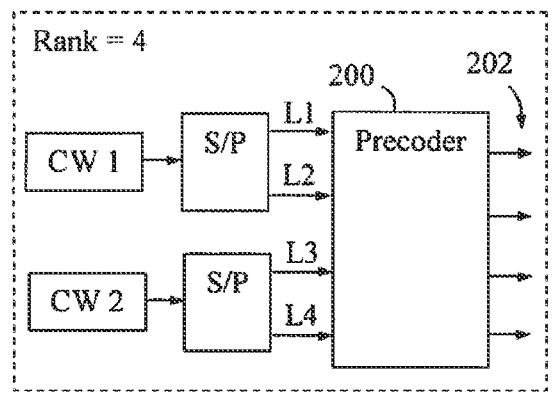

The latter embodiments above would effectively introduce several new codeword to layer mappings, thereby providing a more flexible choice of which layer to use in the transmission. For example, when transmission rank=2, it would be possible to transmit a single codeword using two layers, e.g. as shown in FIG. 2c.

The exemplary embodiments described above can be used to improve the efficiency for encoding precoder related information, e.g. in a control message from a base station to a user terminal to control an associated wireless data transmission either on the downlink or the uplink. Signalling overhead can thus be saved by decreasing the control channel bits, while at the same time additional functionality can be introduced for supporting rank override and for transmission of a single codeword using two-layer spatial multiplexing. It should be noted that the above-described encoding of information bits in the precoding information field(s) to indicate that a codeword is enabled/disabled, may also be jointly based on values in other fields in the control message, e.g. the NDI/RV fields in FIG. 5, in addition to values set in the TBS fields. The present invention is thus not limited in this respect.

While the invention has been described with reference to specific exemplary embodiments, the description is in general only intended to illustrate the inventive concept and should not be taken as limiting the scope of the invention. For example, although the concepts of LTE, OFDM, MIMO, transport blocks, codewords, layers, feedback reports, transmission rank and channel rank have been used when describing the above embodiments, any other similar suitable terms, parameters, mechanisms and standards may basically be used to accomplish the functions described herein. The present invention is generally defined by the following independent claims.

The invention claimed is:

1. A method in a first node of conveying precoding information in a control message to a second node, the control message containing information that describes properties of an associated wireless data transmission between the first and second nodes employing spatial multiplexing and precoding information for sending codewords corresponding to transport blocks in said wireless data transmission, comprising the steps of:
   determining precoding parameters to be included in said control message to the second node;
   encoding control information bits in at least one precoding information field of the control message according to the determined precoding parameters based on values in payload size related fields in the control message, wherein said payload size related field values are used to indicate that a first codeword is enabled while a second codeword is disabled, or that two codewords are enabled, whereby an interpretation of said control information bits in the precoding information field(s) is determined based on whether one or two codewords are enabled; and
   sending said control message with said precoding information and payload size related fields to the second node.

2. A method according to claim 1, wherein bits in the precoding information field(s) of the control message imply different predefined sets of precoding information messages depending on the set payload size related field values.

3. A method according to claim 1, wherein the precoding information comprises any one or both of: a transmission rank indicating a number of parallel layers or data streams being simultaneously used for the associated data transmission, and at least one selected precoder matrix used for adapting signals transmitted from multiple antennas at the node sending said data.

4. A method according to claim 1, wherein said data is transmitted from the first node to the second node and said precoding parameters are determined based on current channel properties indicated in a feedback report received from the second node, and/or by the amount of retransmissions due to decoding errors at the second node.

5. A method according to claim 1, wherein the second node is a terminal and the first node is a base station ordering the terminal to transmit uplink data according to the conveyed precoding information.

6. A method according to claim 1, wherein said payload size related fields indicate a payload size pair corresponding to the payload size of a first transport block and a second transport block, and said payload size pair is set to indicate:
   that a first codeword is enabled while a second codeword is disabled, or
   that two codewords are enabled.

7. A method according to claim 6, wherein said payload size pair also determines an interpretation of precoder information bits in the control message to support transmission rank override for precoder confirmation when frequency-selective precoding is employed.

8. A method according to claim 1, the control message being a physical downlink control channel (PDCCH) message with precoding related information fields, said precoding related information corresponding to a "Rank Indicator RI" or "Transmission Rank Indicator (TRI)", a "Precoder Matrix Indicator (PMI)", and/or precoder confirmation, wherein these parts in said precoding related information are jointly encoded.

9. A method according to claim 1, wherein the payload size related field values are used to indicate a hybrid automatic repeat request (HARQ) process to codeword mapping, and wherein the payload size related fields values are set to indicate:

that HARQ process 1 is mapped to codeword 1 which is transmitted, that HARQ process 2 is mapped to codeword 1 which is transmitted, or that codewords 1 and 2 are both transmitted.

10. A method according to claim 1, wherein a fixed hybrid automatic repeat request (HARQ) process to codeword mapping is used, and wherein the payload size field related values are set to indicate:

that codeword 1 is transmitted, that codeword 2 is transmitted, or that codewords 1 and 2 are both transmitted.

11. An apparatus in a first node, for conveying precoding information in a control message to a second node, the control message containing information that describes properties of an associated wireless data transmission between the first and second nodes employing spatial multiplexing and precoding information for sending codewords corresponding to transport blocks in said wireless data transmission, comprising:

a processor configured to determine precoding parameters to be included in said control message to the second node;

an encoder configured to encode control information bits in at least one precoding information field of the control message according to the determined precoding parameters based on values in payload size related fields in the control message, wherein the payload size related field values are used to indicate that a first codeword is enabled while a second codeword is disabled, or that two codewords are enabled, whereby an interpretation of said control information bits in the precoding information field(s) is determined based on whether one or two codewords are enabled; and a transceiver configured to send said control message with said precoding information and payload size related fields to the second node.

12. An apparatus according to claim 11, wherein bits in the precoding information field(s) of the control message imply different predefined sets of precoding information messages depending on the set payload size related field values.

13. An apparatus according to claim 11, wherein the precoding information comprises any one or both of: a transmission rank indicating an number of parallel layers or data streams being simultaneously used for the associated data transmission, and at least one selected precoder matrix used for adapting signals transmitted from multiple antennas at the node sending said data.

14. An apparatus according to claim 11, further comprising a signal transmitter adapted to transmit said data to the second node using the determined precoding parameters, wherein apparatus is further adapted to determine said precoding parameters based on current channel properties indicated in a feedback report received from the second node, and/or by the amount of retransmissions due to decoding errors at the second node.

15. An apparatus according to claim 11, wherein the first node is a base station and the second node is a terminal, the base station ordering the terminal to transmit uplink data according to the conveyed precoding information.

16. An apparatus according to claim 11, wherein said payload size related fields indicate a payload size pair corresponding to the payload size of a first transport block and a second transport block, and the apparatus is further adapted to set said payload size pair to indicate:

that a first codeword is enabled while a second codeword is disabled, or that two codewords are enabled.

17. An apparatus according to claim 16, wherein said payload size pair also determines an interpretation of precoder information bits in the control message to support transmission rank override for precoder confirmation when frequency-selective precoding is employed.

18. An apparatus according to claim 11, the control message being a physical downlink control channel (PDCCH) message with precoding related information fields, said precoding related information corresponding to a "Rank Indicator RI" or "Transmission Rank Indicator (TRI)", a "Precoder Matrix Indicator (PMI)", and/or precoder confirmation, wherein the apparatus is further adapted to jointly encode these parts in said precoding related information.

19. An apparatus according to claim 11, wherein the apparatus is further adapted to use the field values to indicate a hybrid automatic repeat request (HARQ) process to codeword mapping, and wherein the payload size related values are set to indicate:

that HARQ process 1 is mapped to codeword 1 which is transmitted, that HARQ process 2 is mapped to codeword 1 which is transmitted, or that codewords 1 and 2 are both transmitted.

20. An apparatus according to claim 11, wherein a fixed hybrid automatic repeat request (HARQ) process to codeword mapping is used and the apparatus is further adapted to use the payload size related field values to indicate:

that codeword 1 is transmitted, that codeword 2 is transmitted, or that codewords 1 and 2 are both transmitted.

21. A method in a second node of obtaining precoding information in a control message from a first node, the control message containing information that describes properties of an associated wireless data transmission between the first and second nodes employing spatial multiplexing and precoding information for sending codewords corresponding to transport blocks in said wireless data transmission, comprising the steps of:

receiving said control message including precoding parameters determined by the first node; and detecting said precoding parameters by decoding control information bits in at least one precoding information field of the control message based on values in payload size related fields in the control message, wherein said values are used to indicate that a first codeword is enabled while a second codeword is disabled, or that two codewords are enabled, whereby an interpretation of said control information bits in the precoding information field(s) is determined based on whether one or two codewords are enabled.

22. A method according to claim 21, wherein the second node receives said data from the first node and said precoding parameters have been determined based on current channel properties indicated in a feedback report sent from the second node, and/or by the amount of retransmissions due to decoding errors at the second node.

23. A method according to claim 21, wherein the first node is a base station and the second node is a terminal being ordered by the base station to transmit uplink data according to the conveyed precoding information.

24. A method according to claim 21, wherein bits in the precoding information field(s) of the control message imply different predefined sets of precoding information messages depending on the set payload size related field values.

25. A method according to claim 21, wherein the precoding information comprises any one or both of: a transmission rank indicating an number of parallel layers or data streams being simultaneously used for the associated data transmission, and at least one selected precoder matrix used for adapting signals transmitted from multiple antennas at the node sending said data.

26. A method according to claim 21, wherein said payload size related fields indicate a payload size pair corresponding to the payload size of a first transport block and a second transport block, and said payload size pair is set to indicate:
  that a first codeword is enabled while a second codeword is disabled, or
  that two codewords are enabled.

27. A method according to claim 26, wherein said payload size pair also determines an interpretation of precoder information bits in the control message to support transmission rank override for precoder confirmation when frequency-selective precoding is employed.

28. A method according to claim 21, the control message being a physical downlink control channel (PDCCH) message with precoding related information fields, said precoding related information corresponding to a "Rank Indicator (RI)" or "Transmission Rank Indicator (TRI)", a "Precoder Matrix Indicator (PMI)", and/or precoder confirmation, wherein these parts in said precoding related information are jointly encoded.

29. A method according to claim 21, wherein the payload size related field values are used to indicate a HARQ process to codeword mapping, and wherein the payload size related fields values are set to indicate:
  that HARQ process 1 is mapped to codeword 1 which is transmitted,
  that HARQ process 2 is mapped to codeword 1 which is transmitted, or
  that codewords 1 and 2 are both transmitted.

30. A method according to claim 21, wherein a fixed hybrid automatic repeat request (HARQ) process to codeword mapping is used and the payload size related field values are used to indicate:
  that codeword 1 is transmitted,
  that codeword 2 is transmitted, or
  that codewords 1 and 2 are both transmitted.

31. An apparatus in a second node of obtaining precoding information in a control message from a first node, the control message containing information that describes properties of an associated wireless data transmission between the first and second nodes employing spatial multiplexing and precoding information for sending codewords corresponding to transport blocks in said wireless data transmission, comprising:
  a transceiver configured to receive said control message including precoding parameters determined by the first node; and
  a decoder configured to detect said precoding parameters by decoding control information bits in at least one precoding information field of the control message based on values in payload size related fields in the control message, wherein said values are used to indicate that a first codeword is enabled while a second codeword is disabled, or that two codewords are enabled, whereby an interpretation of said control information bits in the precoding information field(s) is determined based on whether one or two codewords are enabled.

32. An apparatus according to claim 31, wherein the second node is adapted to receive said data from the first node and said precoding parameters have been determined based on current channel properties indicated in a feedback report sent from the second node, and/or by the amount of retransmissions due to decoding errors at the second node.

33. An apparatus according to claim 31, wherein the first node is a base station and the second node is a terminal being ordered by the base station to transmit uplink data according to the conveyed precoding information.

34. An apparatus according to claim 31, wherein bits in the precoding information field(s) of the control message imply different predefined sets of precoding information messages depending on the set payload size related field values.

35. An apparatus according to claim 31, wherein the precoding information comprises any one or both of: a transmission rank indicating a number of parallel layers or data streams being simultaneously used for the associated data transmission, and at least one selected precoder matrix used for adapting signals transmitted from multiple antennas at the node sending said data.

36. An apparatus according to claim 31, wherein said payload size related fields indicate a payload size pair corresponding to the payload size of a first transport block and a second transport block, and said payload size pair is set to indicate:
  that a first codeword is enabled while a second codeword is disabled, or
  that two codewords are enabled.

37. An apparatus according to claim 36, wherein said payload size pair also determines an interpretation of precoder information bits in the control message to support transmission rank override for precoder confirmation when frequency-selective precoding is employed.

38. An apparatus according to claim 31, the control message being a physical downlink control channel (PDCCH) message with precoding related information fields, said precoding related information corresponding to a "Rank Indicator (RI)" or "Transmission Rank Indicator (TRI)", a "Precoder Matrix Indicator (PMI)", and/or precoder confirmation, wherein these parts in said precoding related information are jointly encoded.

39. An apparatus according to claim 31, wherein the payload size related field values are used to indicate a hybrid automatic repeat request (HARQ) process to codeword mapping, and wherein said payload size pair is set to indicate:
  that HARQ process 1 is mapped to codeword 1 which is transmitted,
  that HARQ process 2 is mapped to codeword 1 which is transmitted, or
  that codewords 1 and 2 are both transmitted.

40. An apparatus according to claim 31, wherein a fixed hybrid automatic repeat request (HARQ) process to codeword mapping is used and the payload size related field values are used to indicate:
  that codeword 1 is transmitted,
  that codeword 2 is transmitted, or
  that codewords 1 and 2 are both transmitted.

* * * * *